United States Patent
Fujita (10) Patent No.: US 11,601,591 B2
(45) Date of Patent: Mar. 7, 2023

(54) IMAGE PROCESSING APPARATUS FOR ESTIMATING ACTION OF SUBJECT AND ADDING INFORMATION INDICATING THE ACTION OF THE SUBJECT TO AN IMAGE, METHOD FOR CONTROLLING THE SAME, AND STORAGE MEDIUM

(71) Applicant: CANON KABUSHIKI KAISHA, Tokyo (JP)

(72) Inventor: Shunji Fujita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/167,504

(22) Filed: Feb. 4, 2021

(65) Prior Publication Data

US 2021/0250496 A1  Aug. 12, 2021

(30) Foreign Application Priority Data

Feb. 10, 2020  (JP) ............................. JP2020-020890

(51) Int. Cl.
*H04N 5/232* (2006.01)
*G06V 40/20* (2022.01)
*H04N 1/21* (2006.01)

(52) U.S. Cl.
CPC ......... *H04N 5/23229* (2013.01); *G06V 40/20* (2022.01); *H04N 1/212* (2013.01)

(58) Field of Classification Search
CPC ........... H04N 5/23229; H04N 1/00127; H04N 1/00167; H04N 1/00169; H04N 1/00172; H04N 1/00204; H04N 1/2112; H04N 1/212; H04N 1/32101; H04N 5/232; G06V 40/20; G06V 20/40
See application file for complete search history.

(56) References Cited

U.S. PATENT DOCUMENTS

| | | | |
|---|---|---|---|
| 10,038,812 B2* | 7/2018 | Takeuchi | H04N 1/2145 |
| 10,157,190 B2* | 12/2018 | Shih | H04L 67/10 |
| 2008/0198243 A1* | 8/2008 | Kijima | H04N 1/2112 348/231.99 |
| 2011/0050942 A1* | 3/2011 | Migiyama | G06F 16/58 348/222.1 |
| 2012/0069217 A1* | 3/2012 | Osuka | H04N 5/907 348/E5.031 |
| 2017/0012926 A1* | 1/2017 | Lennan | H04N 1/00169 |
| 2017/0332050 A1* | 11/2017 | Yamashita | G06K 7/1413 |
| 2021/0241422 A1* | 8/2021 | Burke, III | G06T 3/0093 |

FOREIGN PATENT DOCUMENTS

JP  2018101317 A  6/2018

* cited by examiner

Primary Examiner — Hung H Lam
(74) Attorney, Agent, or Firm — Rossi, Kimms & McDowell LLP (57) ABSTRACT

An image processing apparatus acquires a plurality of pieces of image data sequentially outputted from an imager and, in accordance with reception of an image capturing instruction to capture a still image, specify as image data to be processed a plurality of pieces of image data in a period that includes a timing at which the still image is captured. The image processing apparatus, based on an action of a subject estimated using the image data to be processed, add information that indicates the action of the subject to data of the still image.

13 Claims, 8 Drawing Sheets

| NUMBER OF EXECUTIONS | TIME STAMP | LV IMAGE NUMBERS | RECOGNITION RATES |
|---|---|---|---|
| 1 | 10:05:23.100 | $f_{n+5} \sim f_{n-5}$ | 0.25, 0.25, 0.25, 0.25 |
| 2 | 10:05:23.120 | $f_{n+8} \sim f_{n-8}$ | 0.10, 0.30, 0.30, 0.30 |
| 3 | 10:05:23.140 | $f_{n+10} \sim f_{n-10}$ | 0.00, 0.05, 0.90, 0.05 |

IMAGE PROCESSING APPARATUS FOR ESTIMATING ACTION OF SUBJECT AND ADDING INFORMATION INDICATING THE ACTION OF THE SUBJECT TO AN IMAGE, METHOD FOR CONTROLLING THE SAME, AND STORAGE MEDIUM

BACKGROUND OF THE INVENTION

Field of the Invention

The present invention relates to an image processing apparatus for adding information indicating an action of a subject to an image, a method for controlling the same, and a storage medium.

Description of the Related Art

In recent years, an image recognition technique using machine learning, specifically, a technique for recognizing a specific subject by inputting an image that was captured by an image capturing apparatus into an estimation model that was trained using training data that includes the specific subject, is known.

Also, a technique for applying an estimation model that is related to image recognition in relation to not only still images but also moving images is known. Specifically, a technique for recognizing a specific action that is included in a moving image by inputting the moving image into an estimation model that was trained using training data that includes a moving image in which a specific action of a subject is captured is known. In Japanese Patent Laid-Open No. 2018-101317, a technique for automatically generating descriptive text of a moving image using a multilayer neural network by inputting into an estimation model a moving image that was captured by a security camera is proposed.

Incidentally, in order to accurately obtain, using an estimation model, an action of a subject in a moving image, it is necessary to input into the estimation model a moving image of an appropriate range in which a target action scene is included. On this point, Japanese Patent Laid-Open No. 2018-101317 performs moving image analysis using a multilayer neural network, but it did not consider deciding the most appropriate range of a moving image to input into the neural network.

SUMMARY OF THE INVENTION

The present disclosure has been made in consideration of the aforementioned issues, and realizes a technique that can more accurately estimate an action of a subject to be captured by deciding a moving image of an appropriate range for estimating an action of a subject.

In order to solve the aforementioned problems, one aspect of the present disclosure provides an image processing apparatus comprising: one or more processors; and a memory storing instructions which, when the instructions are executed by the one or more processors, cause the image processing apparatus to function as: an acquisition unit configured to acquire a plurality of pieces of image data sequentially outputted from an image capturing unit; a specification unit configured to, in accordance with reception of an image capturing instruction to capture a still image, specify, among the plurality of pieces of image data, as image data to be processed a plurality of pieces of image data in a period that includes a timing at which the still image is captured; and a control unit configured to, based on an action of a subject estimated using the image data to be processed, add information that indicates the action of the subject to data of the still image.

Another aspect of the present invention provides, a method for controlling an image processing apparatus, the control method comprising: acquiring a plurality of pieces of image data sequentially outputted from an image capturing unit; in accordance with reception of an image capturing instruction to capture a still image, specifying, among the plurality of pieces of image data, as image data to be processed a plurality of pieces of image data in a period that includes a timing at which the still image is captured; and controlling, based on an action of a subject estimated using the image data to be processed, to add information that indicates the action of the subject to data of the still image.

Still another aspect of the present invention provides, a non-transitory computer-readable storage medium comprising instructions for performing a control method of an image processing apparatus, the control method comprising: acquiring a plurality of pieces of image data sequentially outputted from an image capturing unit; in accordance with reception of an image capturing instruction to capture a still image, specifying, among the plurality of pieces of image data, as image data to be processed a plurality of pieces of image data in a period that includes a timing at which the still image is captured; and controlling, based on an action of a subject estimated using the image data to be processed, to add information that indicates the action of the subject to data of the still image.

According to the present invention, it becomes possible to more accurately estimate an action of a subject to be captured by deciding a moving image of an appropriate range for estimating an action of a subject.

Further features of the present invention will become apparent from the following description of exemplary embodiments (with reference to the attached drawings).

DESCRIPTION OF THE EMBODIMENTS

First Embodiment

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following, an example in which a digital camera that can apply an estimation model in relation to moving images is used as an example of an image processing apparatus will be described. However, the present embodiment can be applied not only to digital cameras but also to other devices that can apply an estimation model in relation to moving images. Such a device may include a personal computer, a mobile phone which includes a smartphone, a game device, a tablet terminal, a clock-type or glasses-type information terminal, a medical device, devices for a monitoring system or an in-vehicle system, or the like, for example.

(Configuration of Digital Camera)

Figure 1:
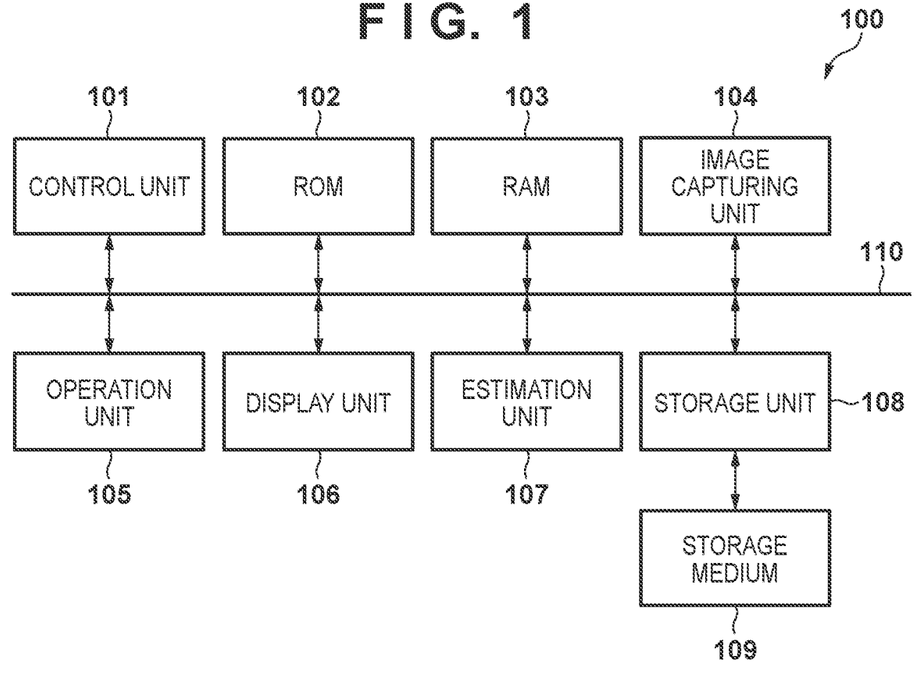
FIG. 1 is a block diagram illustrating an example of a functional configuration of a digital camera as an example of an image processing apparatus according to a first embodiment.

FIG. 1 is a block diagram illustrating an example of a functional configuration of a digital camera 100 as an example of the image processing apparatus of the present embodiment. Note that one or more of the functional blocks illustrated in FIG. 1 may be implemented by hardware such as an ASIC and a programmable logic array (PLA) or by software executed by a programmable processor such as a CPU or an MPU. Also, one or more of the functional blocks may be realized using a combination of software and hardware. Accordingly, in the following description, even if different functional blocks are described as portions that mainly perform operations, these portions may be realized by the same hardware.

A control unit 101, which includes one or more processors such as a CPU, an MPU, and GPU, controls operations of the entire digital camera by executing programs stored in a ROM 102.

The ROM 102 includes a non-volatile semiconductor memory, for example, and stores control programs executed by the control unit 101. A RAM 103 includes a volatile semiconductor memory, for example, and is used as a work memory for the control unit 101 to execute programs or as a temporary storage region for various data.

An image capturing unit 104 includes a capturing lens, a diaphragm, a shutter, a capturing sensor such as a CMOS sensor, an A/D conversion unit and the like and generates an analog image signal of light formed on the capturing sensor via the capturing lens and then outputs image data by converting it into a digital image signal. Image data outputted from the image capturing unit 104 is deployed in the RAM 103. The image capturing unit 104 can output a plurality of pieces of sequentially-outputted image data (LV image) and a still image for storage which is a data of a single image. An LV image is a moving image that is outputted from the image capturing unit 104 during an image capturing operation and is image data in a YUV format that is displayed on a display unit 106 in real time. Also, the LV image is used as data for estimation that is to be inputted into an estimation unit 107. Still image data for storage is high-resolution image data generated by an image capturing instruction from a user and is stored in a storage medium 109 via a storage unit 108. Because still image data for storage is high resolution, the image capturing unit 104 may output it as a compressed JPEG format, for example.

An operation unit 105 receives a user operation and then notifies the inputted information to the control unit 101. The operation unit 105 includes a touch panel, a button switch, arrow keys, and the like, for example. The display unit 106 includes a display member such as a liquid crystal panel and an LED and displays, to the user, information that is related to a state of the digital camera 100, a live view image that is generated by the image capturing unit 104, image data that is stored in the storage medium 109, and the like.

The estimation unit 107 includes a GPU or an application-specific circuit, for example, and estimates an action of a subject included in moving image data by analyzing moving image data that is inputted from the image capturing unit 104. The estimation unit 107 outputs, as an estimation result, an action label and a recognition rate related to the action label. A configuration of the estimation unit 107 will be described later.

The storage unit 108 performs control of reading/writing of data related to the storage medium 109. The storage unit 108 controls initialization of the storage medium 109 and transfer of data between the storage medium 109 and the RAM 103. The storage medium 109 includes a memory card and a flash memory, for example, and is a device comprising a large-volume storage region. An internal bus 110 is a bus for communicating control signals that are exchanged between each processing unit described above.

(Processing Flow Related to Image Data)

Figure 2:
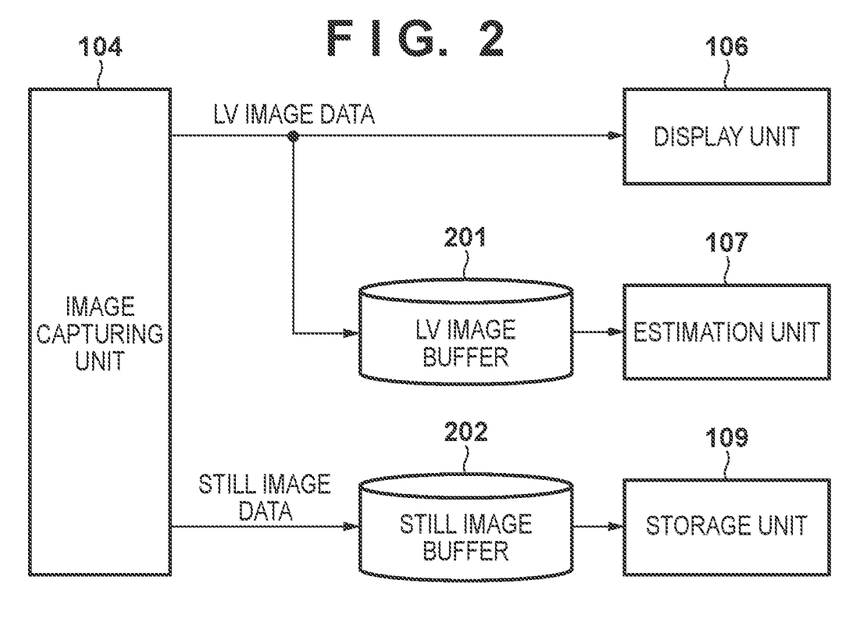
FIG. 2 is a view describing a flow of image data in a digital camera according to the first embodiment.

Next, a flow for the digital camera 100 to process image data will be described with reference to FIG. 2. In the present processing, metadata is added to a still image by applying estimation processing (action recognition processing) to a moving image associated with the still image being captured. More specifically, when a still image is captured on the digital camera 100, an action of a subject is recognized by inputting into an estimation model images (in other words, an LV image) that are consecutively captured in a time direction before/after a timing that the still image is captured. Then, metadata based on the recognition result is added to the captured still image.

For example, in a case where a figure skater is captured, metadata such as "quadruple jump" is automatically added to a captured image when a still image of a performing athlete is captured. This information of "quadruple jump" is information that can be obtained by performing action recognition targeting a moving image close to (before/after) a capturing timing of the still image (it cannot be obtained by analyzing the captured still image itself).

First, the image capturing unit 104 generates an LV image (configuring moving image data) and still image data for storage. LV images are successively outputted at a constant time interval while the image capturing unit 104 is operating and are transmitted to the display unit 106 and an LV image buffer 201. In the present embodiment, image data in a YUV format whose resolution is 800×600 is generated at a speed of 20 frames per second, for example, and is outputted as an LV image. The display unit 106 displays in real time the transmitted LV images.

The LV image buffer 201 is a region for temporarily storing LV images of only a predetermined number of frames and configures a portion of the RAM 103. In a case where the number of inputted LV images exceeds an upper limit, the LV images are deleted in order from the oldest. LV images stored in the LV image buffer 201 are used as images for inputting into the estimation unit 107. Accordingly, the number of stages (the maximum number of LV images that can be stored) of the buffer is predefined in accordance with time of an action scene to be estimated. In the present embodiment, as an example, the number of stages is configured assuming that the type of figure skating jump is to be estimated. For example, assuming that the time it takes for an athlete from when he/she begins a motion to jump until when he/she lands on the ice is approximately two seconds, the number of stages is set to three seconds' worth including a margin. Because the generation speed is 20 seconds per frame as described above, the number of frames is 60. An LV image that was temporarily stored in the LV image buffer 201 is inputted into the estimation unit 107 by the control unit 101 at a timing when estimation is executed.

Still image data is generated by the image capturing unit 104 in accordance with an image capturing instruction by the user having pressed a shutter button of the operation unit 105 and then is stored in a still image buffer 202. In the present embodiment, image data in a JPEG format whose resolution is 4000×3000 is generated, for example. Still image data that is stored in the still image buffer 202 is converted into a predetermine file format by the control unit 101 thereafter and is stored in a large-volume storage medium such as a memory card via the storage unit 108.

(Overview of Processing in Estimation Unit)

Next, an overview of processing in the estimation unit 107 will be described with reference to FIG. 3. The estimation unit 107 is configured by a learning model based on a 3D-CNN (Convolutional Neural Network) which is a known deep learning technology for recognizing moving images. A 3D-CNN is a neural network that is extended, relative to typical CNNs that are conventionally known for performing processing in relation to two dimensional information (still image), so as to be able to perform analysis that is related to three-dimensional data to which a time direction is further added.

As a learning model that is used in the estimation unit 107, a model for which learning processing was conducted in advance by using training data in accordance with a target to be estimated is used. In the present embodiment, a model for which learning processing that is related to figure skating jumps was performed in advance is used for estimating jumps, for example. In learning processing, learning model parameters such as a weighting coefficient to be described later are optimized by repeatedly inputting, into a learning model, training data that is configured by pairs of a moving image in which a respective type of figure skating jump is captured and correct label thereof. In the correct labels of the training data, an action label corresponding to a jump in a moving image, such as "single jump", "double jump", and "triple jump", is included.

Note that in an example of the estimation unit 107 in the present embodiment, description is given using as an example a learning model for estimating which figure skating jump a jump is; however, a target of estimation may be other things. The estimation unit 107 may estimate movements other than figure skating jumps or may estimate whether a moving image is something in which a sport is captured. Also, it may estimate which move or skill of another sport is captured in a moving image.

For example, in a case where a learning model estimates movements other than figure skating jumps, a configuration may be taken so as to use training data in which an action label representing a corresponding movement such as "xx step" is added to a moving image of a figure skater in which a movement other than jumps is included. Also, a configuration may be taken so as to estimate which sport an action that is included in a moving image is by training using learning data in which action labels representing corresponding sports such as "figure skating", "soccer", and "rugby" were added to moving images of various sports. Of course, a configuration may be taken so that what movement and of which sport and the like can be estimated by adding what movement/move and of which sport it is to an action label. Also, no limitation is made to the above-described example and an action may be another so long as an action of a subject is estimated from a moving image before/after a capturing timing. For example, in a case of a soccer shot or a rugby kick, it is assumed that a still image is captured at the moment or immediately after a ball is kicked. Accordingly, applications such as enabling estimation of whether or not the shot or the kick went into a goal using, as an input, an LV image of a predetermined period before/after that still image was captured can be considered.

Image data 301, which is to be inputted into the estimation unit 107, is a plurality of pieces of image data continuous in a time direction. This image data 301 corresponds to an LV image selected for estimation by the control unit 101.

A convolution/pooling processing unit 302 is a processing unit that repeats convolution processing and pooling processing in relation to inputted image data. In convolution processing, a feature point of an image is extracted using a filter that can be applied to a two-dimensional space of an image and a filter that can be applied in a time direction of an image. Also, in pooling processing, after convolution processing, an amount of information of image data is reduced while maintaining important information on feature points (for example, by processing such as max pooling in which the largest gain value of processing target data is taken).

A feature map 303 indicates a feature map that is generated as a result of having convolution processing and pooling processing repeated a predetermined number of times. A size per map and a total number of feature maps generated here depend on a specification of filter (for example, the size or stride of the filter) used in convolution processing and the number of times convolution was repeated.

Fully-connected layers 304 are fully-connected layers that are configured by a multilayer perceptron and execute estimation processing related to feature maps which were extracted in accordance with a weighting coefficient between neurons decided by learning in advance. The fully-connected layers 304 are configured by a plurality of layers and the last layer is an output layer. Circular shapes illustrated in each layer represent neurons and are units modeling nerve cells. Information of each pixel in the feature map 303 is inputted into each unit of the first layer of fully-connected layers, weighting coefficients that were optimized by learning processing in advance are applied, and the result is outputted to all the nodes in the next layer. This processing is repeatedly executed via a plurality of layers and eventually, a final result is outputted from each unit of the output layer. The final results are numerical values corresponding to recognition rates related to action labels, for example. For numerical values of recognition rates, values that were normalized by a softmax function, for example, are outputted so that a sum of outputs of all the units equals 1.0 (100%).

The number of units in the output layer corresponds to the types of action labels to be estimated. For example, as illustrated in FIG. 3, in a case where the output layer is configured by four units, each unit corresponds to each of four types of action labels. In other words, each unit of the output layer corresponds to a respective one of the action labels of "single jump", "double jump", "triple jump", and "quadruple jump". When an LV image is inputted and calculation in a model is performed, a signal value indicating a recognition rate is outputted from each of four units configuring the output layer, in which each result indicates a probability that an LV image is recognized as a certain jump. Among outputs (recognition rates 1 to 4) of the respective output layer units, in a case where a value of the recognition rate 3 is high, for example, it can be determined that a probability that a movement of "triple jump" was captured in the inputted moving image is high.

Note that in a case where various movements including other figure skating movements are estimated, the output layer is configured to output recognition rates related to each of the other movements such as "single jump", "double jump", so on, and "xx step". Also, in a case of estimating which sport an action included in a moving image is, the output layer is configured to output recognition rates related to various sports such as "figure skating", "soccer", "rugby", and so on.

Figure 3:
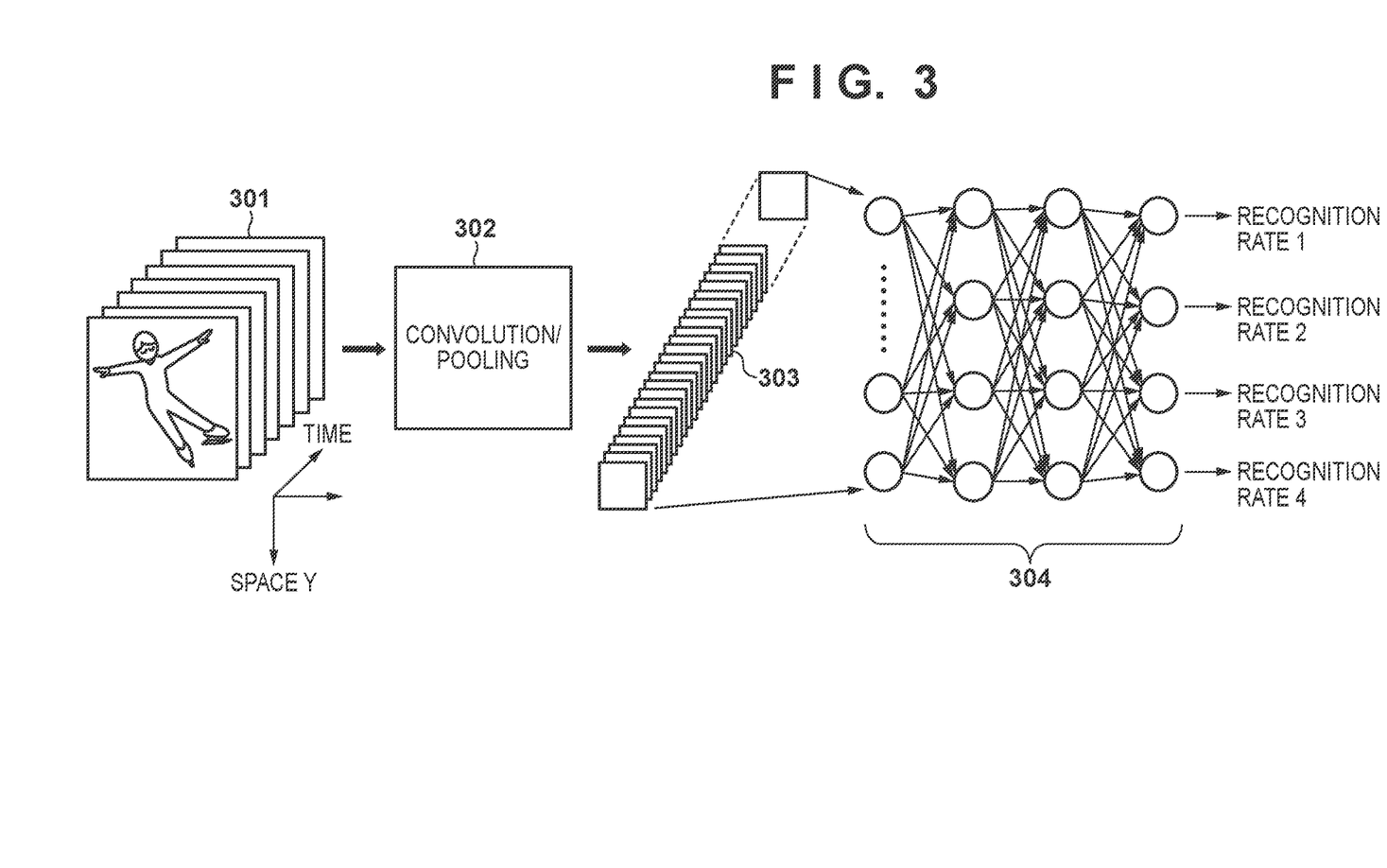
FIG. 3 is a view describing an overview of processing in an estimation unit according to the first embodiment.

Also, although a configuration of the convolution/pooling processing unit 302 is not clearly indicated in the view illustrated in FIG. 3, it can be configured by a multilayer perceptron including a convolution layer and a pooling layer.

(Series of Operations Related to Still Image Capturing Processing)

Figure 4:
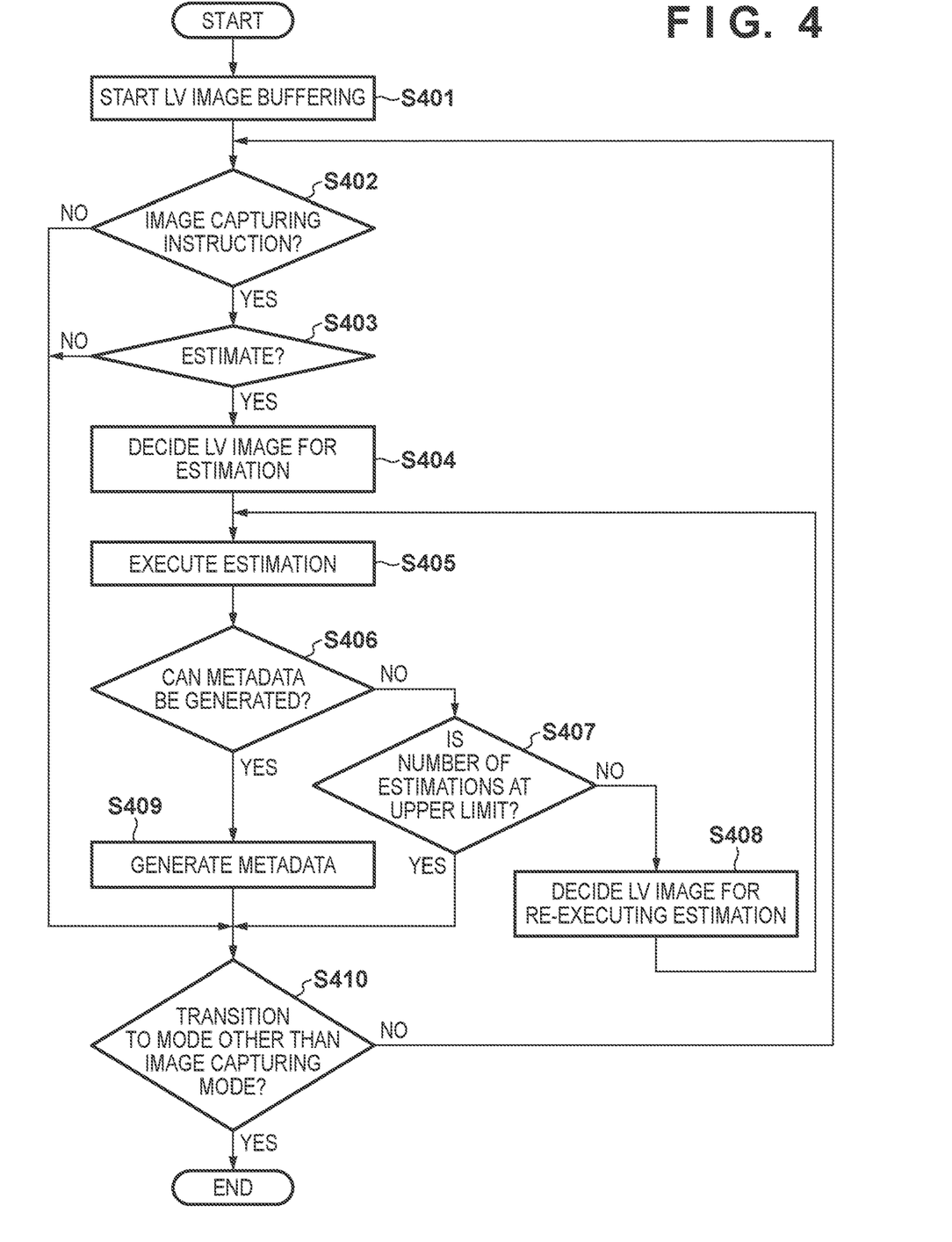
FIG. 4 is a flowchart illustrating a series of operations in still image capturing processing according to the first embodiment.

Next, a series of operations related to still image capturing processing will be described with reference to FIG. 4. Note that the present processing is realized by the control unit 101 deploying a program that is stored in the ROM 102 into a work region of the RAM 103 and then together with executing the program, causing the image capturing unit 104, the estimation unit 107, and the like to operate. Also, the present sequence of processing is started when the digital camera 100 transitions to an image capturing mode. Here, an image capturing mode is one of the operation modes of the digital camera 100 and refers to an operation mode in which a still image can be captured at any time by the user pressing a shutter button. For example, an operation mode in which a capturing function does not operate and a still image stored in a memory card is reproduced and displayed on a liquid crystal monitor does not correspond to this.

In step S401, the control unit 101, starts processing for generating an LV image by controlling the image capturing unit 104 when transition is made to the image capturing mode. The generated LV image is transmitted to the display unit 106 and the LV image buffer 201 as described above.

In step S402, the control unit 101 determines whether an image capturing instruction to capture a still image was received from the user. The control unit 101, in a case where it determines that an image capturing instruction to capture a still image was received based on a signal from the operation unit 105, for example, proceeds to step S403. Meanwhile, the control unit 101, in a case where it determines that an image capturing instruction to capture a still image was not received, proceeds to step S410. At this time, in step S410, in a case where it is determined that a transition to other operation modes is not made, the processing returns again to step S402 and the control unit 101 continues to wait for an image capturing instruction.

In step S403, the control unit 101 determines whether to execute action recognition estimation together with still image capturing. In a case where a subject (person or animal) whose action is to be recognized is not captured in the first place in a still image captured by the user, estimation processing thereafter will be redundant, and therefore, it is determined whether there is the need to execute action recognition estimation in this step. For example, the control unit 101 determines whether a person or animal can be detected from an LV image that was generated at a timing when an image capturing instruction was received. Because this detection processing can be realized by applying a known face detection technology or object detection processing, processing details will be omitted. In a case where the control unit 101, as a result of the detection processing, determines to execute action recognition estimation due to a subject whose action is to be recognized being detected, the control unit 101 proceeds to step S404 and otherwise, the control unit 101 proceeds to step S410 (after which the processing returns to step S402 again and the control unit 101 waits for an image capturing instruction to capture a still image).

In step S404, the control unit 101 decides an LV image to input into the estimation unit 107 from LV images that are temporarily stored in the LV image buffer 201. Specifically, the control unit 101 decides leading and trailing LV images from a plurality of LV images continuing in a time direction and stored in the LV image buffer 201.

Figure 5A:
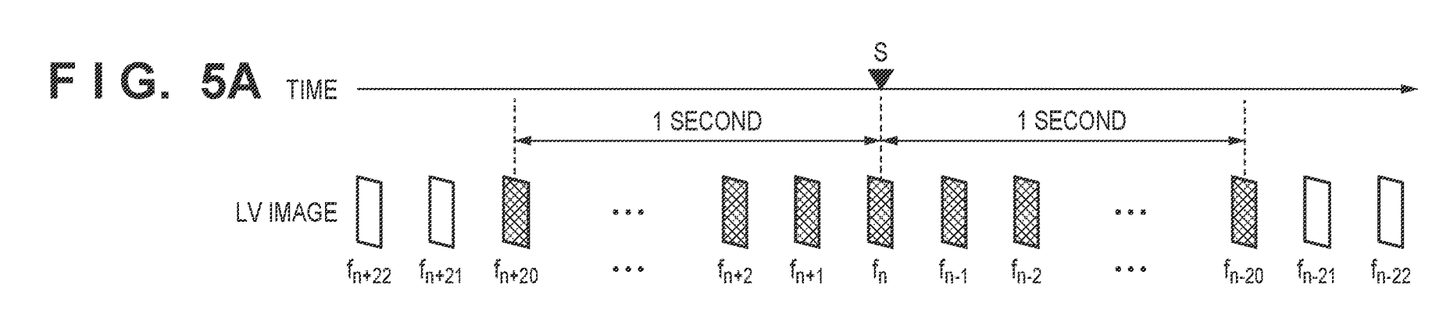
FIGS. 5A to 5C are views describing an LV image for estimation according to the first embodiment.

In order to execute highly accurate action recognition processing in the estimation unit 107, an LV image of a timing before a subject starts a target action is desired for a leading LV image and an LV image of a timing after an action to be estimated is ended is desired for a trailing LV image. Accordingly, the control unit 101 decides a range so as to include LV images both before/after an image capturing instruction timing. In other words, the control unit 101 decides, as LV images to be processed, a plurality of LV images of a period including an image capturing instruction timing from a plurality of LV images that were stored in the LV image buffer 201. In the present embodiment, assuming that a total time of a jump is approximately two seconds, for example, LV images of a total of two seconds with a capturing timing at the center are selected. For example, as illustrated FIG. 5A, an LV image that is generated at the same time as a capturing timing at time S is fn. For example, in a case where an LV image is generated at a speed of 20 frames per second, an interval between adjacent LV images is 50 milliseconds. In a case of selecting LV images of a total of two seconds with a capturing timing at the center, the leading LV image is the LV image that was generated one second before the capturing timing, and fn−20 corresponds to that. Meanwhile, the trailing LV image is the LV image that was generated one second after the capturing timing, and fn+20 corresponds to that. As described above, the control unit 101 decides LV images from fn−20 to fn+20, for example, as LV images to input into the estimation unit 107.

In step S405, the control unit 101 inputs into the estimation unit 107 LV images decided as processing targets in step S404, causes the estimation unit 107 to execute estimation processing, and then acquires recognition rate information corresponding to each action label as an estimation result. Also, the control unit 101 performs processing for counting the number of times estimation processing was executed and performs processing for recording in the RAM 103 an estimation execution history. This execution history information is used in processing for deciding input images when re-executing estimation processing.

Figure 6:
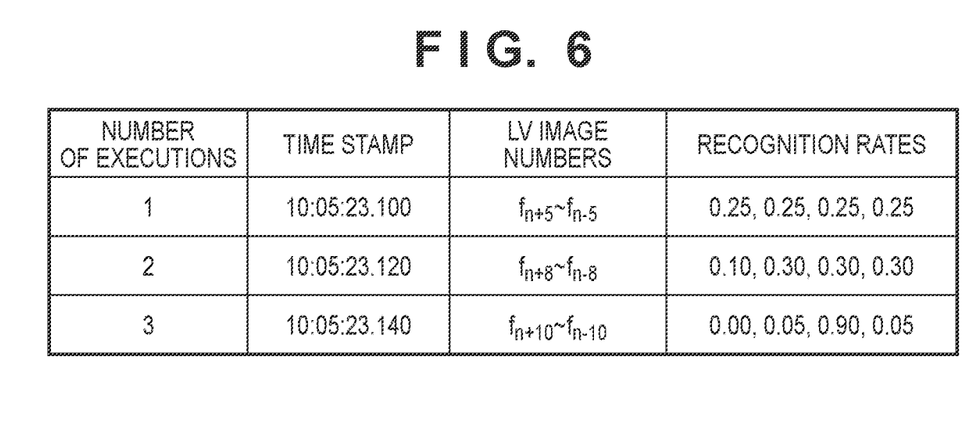
FIG. 6 is a view indicating an example of stored estimation results according to the first embodiment.

Here, FIG. 6 shows an example of execution history information. In this example of execution history information, the number of executions, a time stamp, LV image numbers, and recognition rates, for example, are recorded. The time stamp is information for identifying a timing that estimation was executed and is recorded in a format of "hours:minutes:seconds.milliseconds", for example. LV image numbers indicate identifiers of LV images inputted into the estimation unit 107 when executing estimation. Recognition rates are information indicating an estimation execution result and indicate recognition rates related to respective action labels associated with outputs of the estimation unit 107.

In the example indicated in FIG. 6, in the first and second execution results among the number of executions that is identified in the column for the number of executions, all action labels indicate 30% or less in recognition rates. In other words, in the first and second execution results, it is indicated that results with high recognition rates could not be obtained. Meanwhile, in the third execution result, the third action label in a column for recognition rates indicates that the recognition rate is 90%. In other words, in the third execution result, it is indicated that a result that the probability that a movement of "triple jump" is captured is 90% was obtained.

In step S406, the control unit 101 determines whether metadata can be generated based on an estimation result acquired in step S405. The control unit 101, in a case where an estimation result with high recognition rates exceeding a predetermined threshold is obtained, determines that metadata can be generated and then proceeds to step S409, and otherwise, proceeds to step S407.

In step S407, the control unit 101 determines whether the number of times that estimation was executed has reached a predefined upper limit. The control unit 101, in a case where it determines that the number of times that estimation was executed has reached an upper limit, resets to zero a count value of the above-described number of times that estimation processing was executed, deletes execution history information, and then proceeds to step S410. Meanwhile, the control unit 101, in a case where it determines that the number of times that estimation was executed has not reached an upper limit, proceeds to step S408.

In step S408, the control unit 101 re-executes LV image decision processing for re-executing estimation. At this time, the control unit 101 uses the above-described execution history information to decide a range of LV images so that the range will be different from a range of LV images inputted when low recognition rates were outputted from the estimation unit 107. For example, a new range of LV images is decided by increasing or decreasing the width of a range of LV images or by shifting a range of LV images a few frames before/after without changing the width.

In step S409, the control unit 101 associates with still image data that was generated in accordance with an image capturing instruction in step S402 action label information that acquired a high recognition rate. Specifically, it additionally stores the result as metadata in header information of a still image data file stored in the storage medium 109. The metadata is used in processing such as searching and classifying still image data files. Also, in this step, the control unit 101 resets to zero a count value of the above-described number of times that estimation processing was executed and then deletes execution history information.

In step S410, the control unit 101 determines whether an operation mode of the digital camera 100 was changed to another mode from an image capturing mode by the user. The control unit 101, in a case where it determines that an operation mode of the digital camera 100 was changed to another mode, ends the present series of operations. Meanwhile, the control unit 101, in a case where it determines that an operation mode of the digital camera 100 is kept as an image capturing mode, returns to step S402 again and waits for an image capturing instruction.

Note that although the above-described still image capturing processing was envisioned for capturing a single image, the present invention can be applied in relation to continuous image capturing in which a plurality of still images are captured. In the following, description regarding processing in steps S404 and S409 which are applied in a case where continuous image capturing is performed will be supplemented.

Figure 5B:
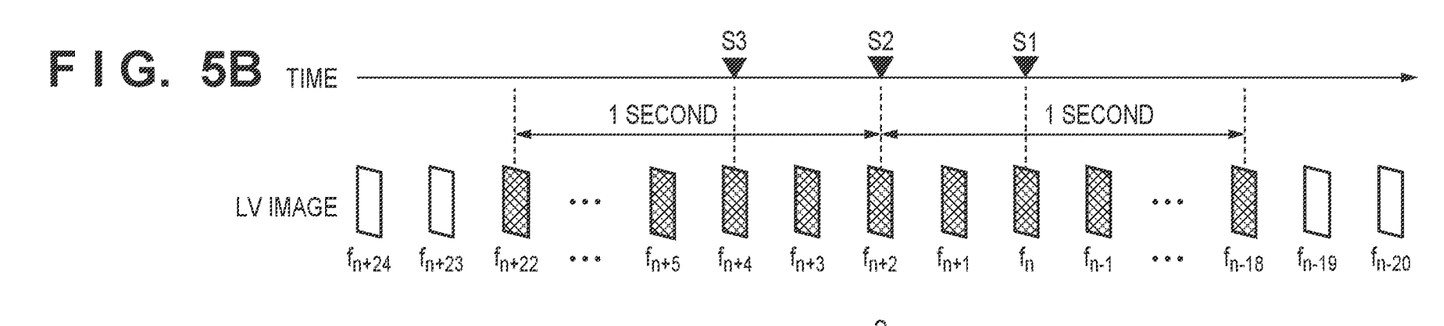

In a case of continuous image capturing, in step S404, the control unit 101 selects, as LV images for estimation, LV images of a total of two seconds with a central capturing timing at the center from among a plurality of capturing timings in a continuous capturing period. For example, an example of a case where three still images were captured by continuous image capturing in which continuous capturing speed was 10 seconds per frame is illustrated in FIG. 5B. S1, S2, and S3 are capturing timings during a continuous capturing period and LV images that are generated at respective timings are fn, fn+2, and fn+4. In a case where continuous capturing speed is 10 frames per second, for example, an interval between each capturing timing is 0.1 second. The middlemost capturing timing in the above-described continuous capturing period is S2. In a case of selecting LV images of a total of two seconds with S2 at the center, the leading LV image is the LV image that was generated one second before S2, and fn−18 corresponds to that. Meanwhile, the trailing LV image is the LV image that was generated one second after S2, and fn+22 corresponds to that. In other words, the control unit 101 decides LV images from fn−18 to fn+22 as LV images to input into the estimation unit 107.

Also, in a case of continuous image capturing, in step S409, the control unit 101 associates with all of the still image data that was generated by continuous image capturing action label information for which a high recognition rate was obtained. In other words, the control unit 101 associates, with a plurality of still image data, metadata whose content are the same.

As described above, in the present embodiment, a configuration is taken so as to, when performing still image capturing of a subject taking a specific action, decide a period before/after an image capturing instruction, input into a learning model a moving image of the period, and then estimate an action of the subject. Further, a configuration is taken so as to generate as additional still image capturing information, information indicating an estimated action of a subject. With such a configuration, it becomes possible to more accurately estimate an action of a subject to be captured by deciding a moving image of an appropriate range for estimating an action of a subject. Also, it becomes possible to add data that appropriately represent an action of a subject to be captured.

Note that in the present embodiment, description was given using as an example a case where LV images generated by the image capturing unit 104 are used for display and estimation; however, a configuration may be taken so that images for display and images for estimation are each separately generated by the image capturing unit 104. Also, in the above-described embodiment, description was given using as an example a case where LV images that are generated by the image capturing unit 104 were inputted into the estimation unit 107 as is. However, a configuration may be taken so as to convert them into a data format (resolution, encoding type, and the like) that is convenient for processing by the estimation unit 107 before inputting them into the estimation unit 107.

Also, in the above-described embodiment, a method for deciding leading and trailing LV images stored in the LV image buffer 201 was described as a method for deciding LV images to be inputted into the estimation unit 107 in step S404; however limitation is not made to this. A configuration may be taken so as to reduce LV images in a decided range or individually select LV images to input in order to reduce the amount of data to input into the estimation unit 107.

Also, a method for deciding leading and trailing LV images so as to make a capturing timing the center was described as a method for deciding LV images to input into the estimation unit 107 in step S404; however limitation is not made to this. A mechanism for detecting a specific state in which it is estimated that a probability that a still image is to be captured is high may be additionally comprised and a leading LV image may be decided in accordance with a detection timing. This detection timing may be a timing at which it is detected that a digital camera in a state in which it is waiting for an image capturing instruction is motionless using a sensor such as a gyro mechanism, for example. Alternatively, it may be a timing at which focus control related to a subject was performed by the user or it may be a timing at which tracking control related to a subject was performed.

Also, regarding a method for deciding a trailing LV image, it may be an LV image corresponding to a timing at which a predetermined time has elapsed from when still image capturing is executed or a timing at which a subject moves out of an LV image after still image capturing is executed.

Further, in the above-described embodiment, description was given using as an example a configuration in which estimation processing in step S405 is executed within the digital camera 100; however, a configuration may be taken so as to execute the estimation processing in an external apparatus such as a cloud server. In such a case, the digital camera 100 does not comprise the estimation unit 107 indicated in FIG. 1 and FIG. 2 and instead, comprises a communication unit for communicating with an external apparatus. The digital camera 100 provides LV images to a cloud server via this communication unit, requests estimation processing, and then acquires an estimation result provided by an external apparatus. In such a configuration, communication with an external apparatus occurs when performing estimation; however, there is an advantage of being able to utilize in estimation processing an abundant calculation resource of a cloud server (therefore, being able to use a highly accurate estimation algorithm whose calculation amount is larger).

Second Embodiment

A second embodiment will be described below. In the first embodiment, in a case where an estimation result with high recognition rates could not be obtained as a result of executing estimation, a configuration was made so that processing for deciding LV images to input and estimation processing were repeated. In such a case, because the number of times estimation processing is repeated changes depending on LV images inputted into the estimation unit 107, the time it takes for metadata to be generated in step S409 from when an image capturing instruction was received is not constant. In other words, in a case where an estimation result with high recognition rates was obtained in an initial estimation, metadata is immediately generated; however, in a case where estimation was repeated a number of times, the time until metadata is generated becomes long. Accordingly, in the second embodiment, metadata is made to be always generated after fixed time has elapsed from when an image capturing instruction was received by a configuration to be described below. Note that a configuration of the digital camera 100 in the present embodiment is the same or essentially the same as the above-described embodiment, and an operation that is related to still image capturing processing is different. Accordingly, description of a configuration that is the same or essentially the same will be omitted and points of difference will be mainly described.

(Series of Operations Related to Still Image Capturing Processing)

Figure 7:
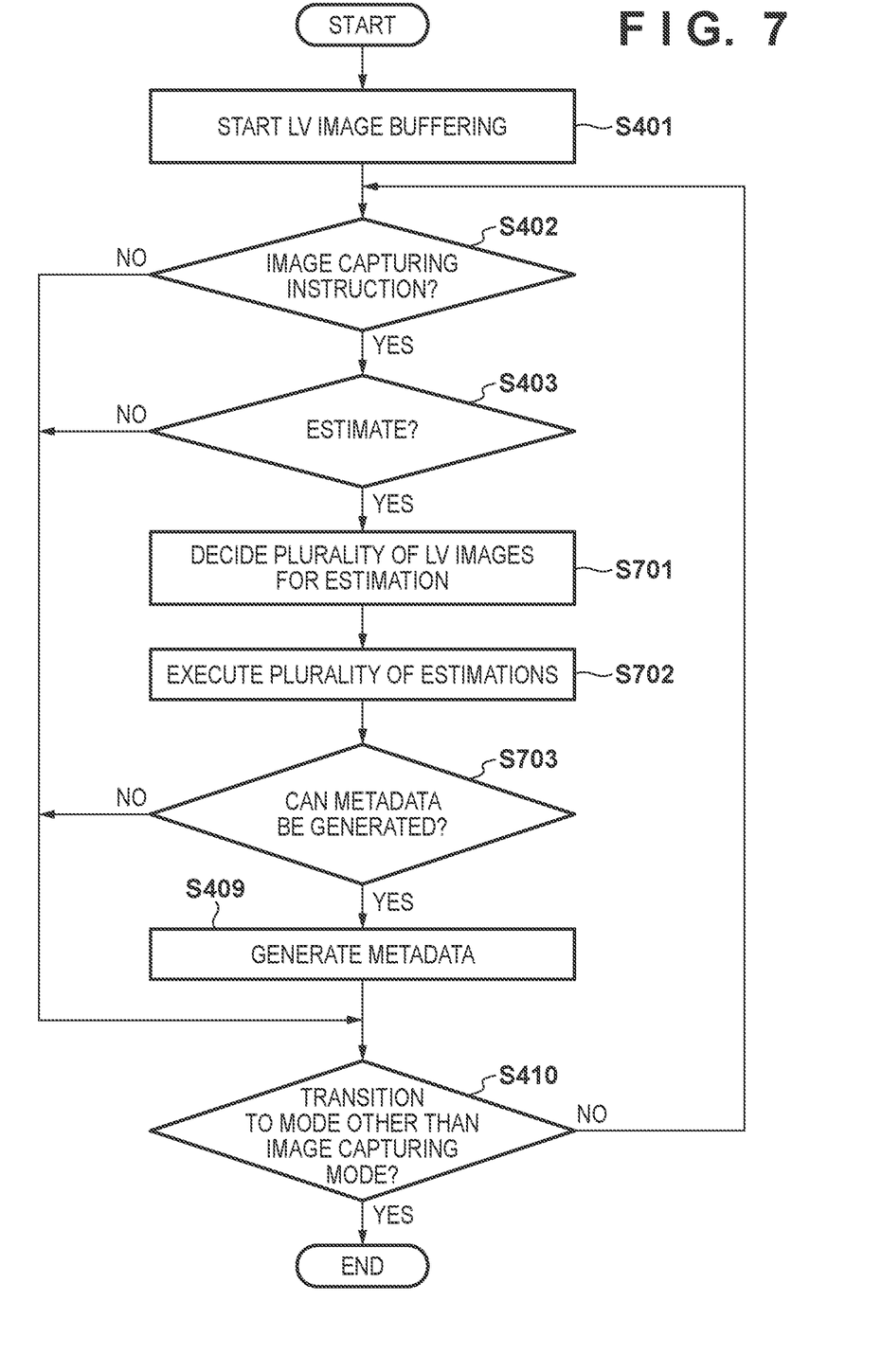
FIG. 7 is a flowchart illustrating a series of operations in still image capturing processing according to a second embodiment.

Still image capturing processing according to the second embodiment will be described with reference to FIG. 7. Note that the present processing is realized by the control unit 101 deploying a program that is stored in the ROM 102 into a work region of the RAM 103 and then together with executing the program, causing the image capturing unit 104, the estimation unit 107, and the like to operate.

First, the control unit 101, similarly to the first embodiment, performs processing in steps S401 to S403, and in a case where it determines to perform estimation, proceeds to step S701.

In step S701, the control unit 101 decides a plurality of types of LV images groups to input into the estimation unit 107 using LV images that are temporarily stored in the LV image buffer 201. Note that several methods for configuring a group (whose types are different) can be conceived. For example, a configuration may be taken so as to generate groups centered on the same LV image but whose range widths (the number of LV images included therein) are different. Also, groups may be generated by shifting the positions of leading and trailing LV images while keeping the number of LV images included in a group the same.

Figure 5C:
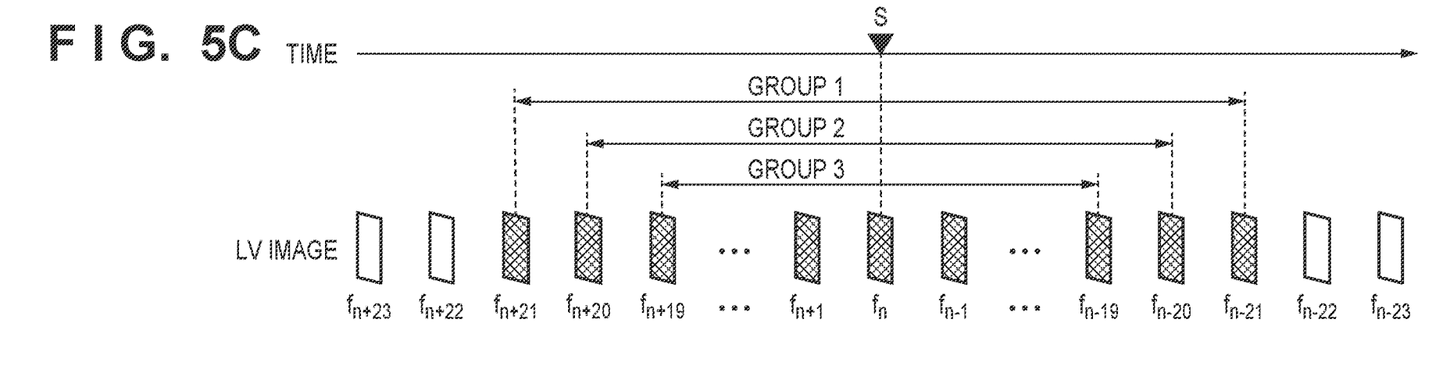

In the present embodiment, it is assumed that three types of groups centered on the capturing timing but having different numbers of LV images included in their ranges are generated, for example. FIG. 5C indicates a method of generating these groups. A group 1, a group 2, and a group 3 indicated in FIG. 5C indicate groups that are decided in this step. A first group is LV images from fn−21 to fn+21, and a second group is LV images from fn−20 to fn+20. Also, a third group is LV images from fn−19 to fn+19.

In step S702, the control unit 101 acquires an estimation result of each group by sequentially inputting into the estimation unit 107 groups of a plurality of LV images decided in step S701. Estimation result details are the same as that of the first embodiment.

In step S703, the control unit 101 determines whether metadata can be generated based on an estimation result acquired in step S702. The control unit 101 references the acquired estimation result of each group, for example, and in a case where an estimation result with high recognition rates exceeding a predetermined threshold is obtained, determines that metadata can be generated and proceeds to step S409, and otherwise, proceeds to step S410.

As described above, in the present embodiment, a configuration is taken so that a plurality of LV images to be estimated is decided as a plurality of types of LV image groups comprising a plurality of different LV images. With such a configuration, it becomes possible to always generate metadata after fixed time has elapsed from when an image capturing instruction was received.

Third Embodiment

Next, a third embodiment will be described. In the first embodiment and the second embodiment, embodiments in which estimation is executed in accordance with reception of a still image capturing instruction were described. This method is a highly efficient method in view of a processing load as estimation processing is executed at a necessary timing. However, from when an image capturing instruction is received until metadata is generated, it always takes as much time as time for executing estimation processing.

In contrast to this, in the third embodiment, a configuration is taken so as not to include time for executing estimation processing in a period from when an image capturing instruction is received until metadata is generated. In other words, estimation result information is generated as necessary by executing estimation processing related to LV images that are inputted, and when an image capturing instruction is received, metadata is generated from the generated estimation result information (without having to execute estimation processing). As described above, in the present embodiment, processing for executing estimation and processing for capturing a still image are executed asynchronously.

Note that a configuration of the digital camera in the present embodiment is the same or essentially the same as the above-described embodiment, and an operation that is related to still image capturing processing is different. Accordingly, description of a configuration that is the same or essentially the same will be omitted and points of difference will be mainly described.

(Series of Operations Related to Estimation Processing)

Figure 8:
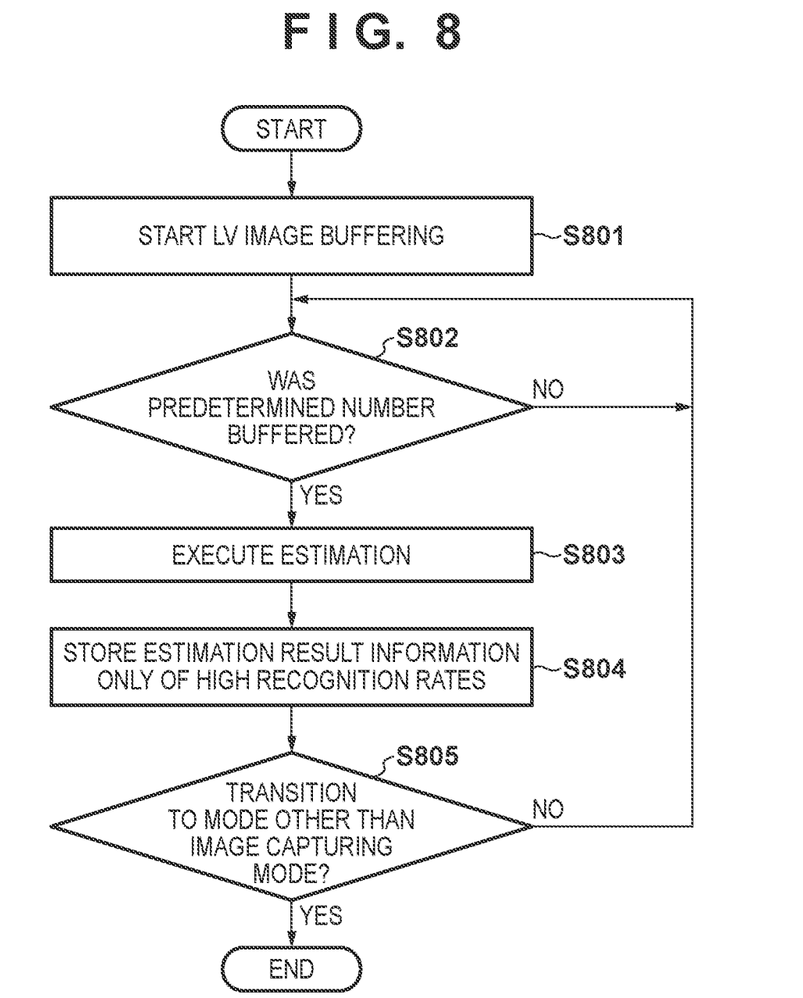
FIG. 8 is a flowchart illustrating a series of operations in estimation processing according to a third embodiment.

A series of operations for estimation processing according to the present embodiment will be described with reference to FIG. 8. Estimation processing according to the present embodiment, as described above, is processing for storing estimation result information by executing estimation processing related to LV images as necessary. Note that the present processing is realized by the control unit 101 deploying a program that is stored in the ROM 102 into a work region of the RAM 103 and then together with executing the program, causing the image capturing unit 104, the estimation unit 107, and the like to operate. Also, the series of operations according to the present processing is started when the digital camera 100 transitions to an image capturing mode.

In step S801, the control unit 101, starts processing for generating an LV image by controlling the image capturing unit 104 when transition is made to the image capturing mode. The generated LV image is transmitted to the display unit 106 and the LV image buffer 201 similarly to in the embodiment described above.

In step S802, the control unit 101 determines whether a predetermined number of LV images are buffered by the LV image buffer 201 and in a case where it determines that they were buffered, proceeds to step S803 and otherwise, waits until they are buffered. The predetermined number indicates the number of LV images that are enough to execute the estimation and is set in accordance with an action scene to be estimated. As an example, in a case where a type of jump is estimated, the number of LV images corresponding to two seconds may be defined as the number of LV images sufficient for executing estimation.

In step S803, the control unit 101 inputs into the estimation unit 107 LV images that are accumulated in the LV image buffer 201 and then acquires an estimation result.

In step S804, the control unit 101, only in a case where recognition rates of an estimation result acquired in step S803 exceeds a predetermined threshold, stores into a region in the RAM 103 the estimation result information. Details of the information stored here is the same as the information indicated in FIG. 6 and includes the number of executions, a time stamp, LV image numbers, and recognition rates.

In step S805, the control unit 101 determines whether an operation mode of the digital camera 100 was changed to another mode from an image capturing mode by the user. The control unit 101, in a case where it determines that an operation mode of the digital camera 100 is kept as an image capturing mode, returns to step S802. Meanwhile, the control unit 101, in a case where it determines that an operation mode of the digital camera 100 was changed to another mode, ends the present series of operations.

(Series of Operations Related to Still Image Capturing Processing)

Figure 9:
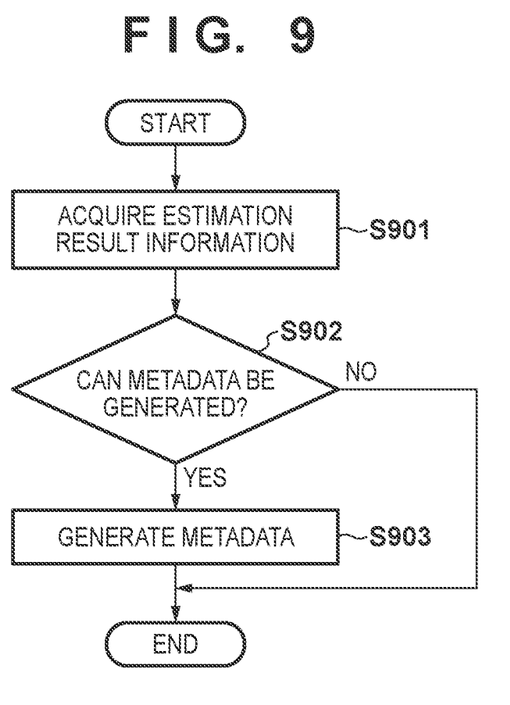
FIG. 9 is a flowchart illustrating a series of operations in still image capturing processing according to the third embodiment.

Next, a series of operations for still image capturing processing of the digital camera 100 according to the third embodiment will be described with reference to FIG. 9. Note that the present processing is realized by the control unit 101 deploying and then executing in a work region of the RAM 103 programs stored in the ROM 102. Also, a series of operations according to the present processing is started at a point in time when an image capturing instruction for a still image is received from the user.

In step S901, the control unit 101 acquires the estimation result information stored in step S804. In step S902, the control unit 101 determines whether metadata can be generated based on the estimation result information acquired in step S901. Specifically, the control unit 101 references a time stamp of the estimation result information and in a case where it detects a time stamp that is the same or close to the timing that an image capturing instruction for a still image was received, determines that metadata can be generated and then proceeds to step S903. Meanwhile, the control unit 101, in a case where it determines that metadata cannot be generated, ends the series of operations for still image capturing processing without generating metadata.

In step S903, the control unit 101 associates with the generated still image data action label information that outputted a high recognition rate in the estimation result corresponding to the time stamp detected in step S902. Specifically, the control unit 101 additionally stores the result as metadata in header information of a still image data file stored in the storage medium 109. The control unit 101, after storing metadata, ends the present series of processing.

As described above, in the present embodiment, a configuration is taken so as to generate estimation result information by executing estimation processing related to LV images inputted as necessary and then when an image capturing instruction is received, to generate meta data from the generated estimation result information (without having to execute estimation processing). With such a configuration, it becomes possible to reduce the time it takes from when an image capturing instruction is received until metadata is generated. Also, even with such a configuration, it is possible to decide a moving image range that is appropriate for estimating an action of a subject and to more accurately estimate an action of a subject to be captured.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-020890, filed Feb. 10, 2020 which is hereby incorporated by reference herein in its entirety.

What is claimed is:

1. An image processing apparatus comprising:
   one or more processors; and
   a memory storing instructions which, when the instructions are executed by the one or more processors, cause the image processing apparatus to function as:
   an acquisition unit configured to acquire a first plurality of pieces of image data sequentially outputted from an image capturing unit;
   a specification unit configured to, in accordance with reception of an image capturing instruction to capture a still image, specify, among the first plurality of pieces of image data, as image data to be processed, a second plurality of pieces of image data in a period that includes a timing at which the still image is captured; and
   a control unit configured to, based on an action of a subject estimated using the second plurality of pieces of image data specified as the image data to be processed, add information that indicates the action of the subject to data of the still image.

2. The image processing apparatus according to claim 1, wherein the instructions, when executed by the one or more processors, further cause the image processing apparatus to function as an estimation unit configured to estimate the action of the subject using the second plurality of pieces of image data specified as the image data to be processed,
   wherein the control unit, based on the action of the subject estimated by the estimation unit, adds the information that indicates the action of the subject.

3. The image processing apparatus according to claim 1, wherein the instructions, when executed by the one or more processors, further cause the image processing apparatus to function as a communication unit configured to communicate with an external apparatus,
   wherein the control unit provides the external apparatus with the second plurality of pieces of image data specified as the image data to be processed and based on the action of the subject estimated using the second plurality of pieces of image data specified as the image data to be processed provided by the external apparatus, adds the information that indicates the action of the subject to data of the still image.

4. The image processing apparatus according to claim 1, wherein the specification unit, among the first plurality of pieces of image data acquired by the acquisition unit, specifies, as the image data to be processed, the second plurality of pieces of image data in a period centered on a timing at which the still image is captured.

5. The image processing apparatus according to claim 1, wherein the specification unit, in a case where an image capturing instruction for sequentially capturing a plurality of still images among the first plurality of pieces of image data acquired by the acquisition unit is received, specifies, as the image data to be processed, the second plurality of pieces of image data in a period that includes a plurality of timings when the plurality of still images were captured.

6. The image processing apparatus according to claim 1, wherein the instructions, when executed by the one or more processors, further cause the image processing apparatus to function as a detection unit configured to detect a specific state in which a probability that a still image is captured is estimated to be high;
   wherein the specification unit, among the first plurality of pieces of image data acquired by the acquisition unit, specifies, as the image data to be processed, the second plurality of pieces of image data in a period that includes a timing detected by the detection unit.

7. The image processing apparatus according to claim 6, wherein the detection unit detects, as the specific state, at least one of a case where a focus control related to a subject is performed and a case where a tracking control related to a subject is performed.

8. The image processing apparatus according to claim 1, wherein the specification unit, among the first plurality of pieces of image data acquired by the acquisition unit, specifies, as the image data to be processed, the second plurality of pieces of image data in each of a plurality of different periods including a timing at which the still image is captured, and
   the control unit, among actions of a subject to be estimated using the second plurality of pieces of image data in each of the plurality of different periods, uses a recognition rate of estimation result that exceeds a predetermined threshold to add information that indicates an action of the subject to data of the still image.

9. The image processing apparatus according to claim 8, wherein the specification unit, in a case where the second plurality of pieces of image data in each of the plurality of different periods that include the timing at which the still image is captured are specified, specifies, as the image data to be processed, the second plurality of nieces of image data in each of the plurality of different periods so that a timing when the still image is captured is the center of each of the plurality of periods.

10. The image processing apparatus according to claim 1, wherein the instructions, when executed by the one or more processors, further cause the image processing apparatus to function as a storage unit configured to store the action of the subject estimated using the second plurality of pieces of image data specified as the image data to be processed,
   wherein the control unit, among an action of the subject stored in the storage unit, based on an action of the subject that corresponds to a timing when the still image is captured, adds information that that indicates an action of the subject to data of the still image.

11. The image processing apparatus according to claim 1, further comprising an image capturing unit.

12. A method for controlling an image processing apparatus, the control method comprising:

acquiring a first plurality of pieces of image data sequentially outputted from an image capturing unit;

in accordance with reception of an image capturing instruction to capture a still image, specifying, among the fir plurality of pieces of image data, as image data to be processed, a second plurality of pieces of image data in a period that includes a timing at which the still image is captured; and controlling, based on an action of a subject estimated using the second plurality of pieces of image data specified as the image data to be processed, to add information that indicates the action of the subject to data of the still image.

13. A non-transitory computer-readable storage medium comprising instructions for performing a control method of an image processing apparatus, the control method comprising:

acquiring a first plurality of pieces of image data sequentially outputted from an image capturing unit;

in accordance with reception of an image capturing instruction to capture a still image, specifying, among the fir plurality of pieces of image data, as image data to be processed, a second plurality of pieces of image data in a period that includes a timing at which the still image is captured; and controlling, based on an action of a subject estimated using the second plurality of pieces of image data specified as the image data to be processed, to add information that indicates the action of the subject to data of the still image.

* * * * *